United States Patent [19]

Morrissette

[11] Patent Number: 4,826,202
[45] Date of Patent: May 2, 1989

[54] COLLAPSIBLE CART

[76] Inventor: Roger J. Morrissette, 265 N. Woodstock Rd., Southbridge, Mass. 01550

[21] Appl. No.: 948,334

[22] Filed: Dec. 30, 1986

Related U.S. Application Data

[63] Continuation-in-part of Ser. No. 711,599, Mar. 13, 1985, Pat. No. 4,635,956.

[51] Int. Cl.$^4$ .............................................. B62B 1/04
[52] U.S. Cl. ...................................... 280/652; 16/112; 280/63; 280/47.26; 280/659; 296/27; 403/199
[58] Field of Search ............... 280/652, 653, 655, 656, 280/639, 659, 47.26, 63, 47.18, 47.33, 47.31, 47.37; 296/27, 29, 32, 36, 35.4, 180; 403/199, 246, 262; 16/115, 112

[56] References Cited

U.S. PATENT DOCUMENTS

| | | | |
|---|---|---|---|
| 767,635 | 8/1904 | Daley | 280/47.33 |
| 959,235 | 5/1910 | Lemieux | 16/115 |
| 1,134,258 | 4/1915 | Curtis | 280/47.18 |
| 2,556,814 | 6/1951 | Love | 280/659 |
| 2,720,413 | 10/1955 | Halverson | 296/27 |
| 2,784,979 | 3/1957 | Chamberlin | 280/47.26 |
| 3,017,710 | 1/1962 | Carlson | 280/47.26 |
| 3,236,198 | 2/1966 | Kreft | 296/27 |
| 3,815,767 | 6/1974 | Lund | 280/47.18 |
| 4,383,695 | 5/1983 | Ray | 280/47.26 |
| 4,416,484 | 11/1983 | O'Neil | 296/43 |
| 4,635,956 | 1/1987 | Morrissette | 280/652 |

FOREIGN PATENT DOCUMENTS

| | | | |
|---|---|---|---|
| 68436 | 1/1983 | European Pat. Off. | 280/63 |
| 761389 | 3/1934 | France | 403/199 |
| 425 | 1/1900 | United Kingdom | 403/199 |
| 25337 | 11/1906 | United Kingdom | 403/199 |
| 786137 | 11/1957 | United Kingdom | 280/659 |
| 822562 | 10/1959 | United Kingdom | 296/27 |
| 1361874 | 7/1974 | United Kingdom | 280/656 |

*Primary Examiner*—Charles A. Marmor
*Assistant Examiner*—Eric Culbreth
*Attorney, Agent, or Firm*—Blodgett & Blodgett

[57] ABSTRACT

A collapsible cart comprising a collapsible storage basket which is mounted on a frame consisting of a longitudinal frame member and a horizontal cross frame member. A pair of wheels are rotatably mounted on the opposite ends of the cross frame member. The storage basket is supported on the frame members when the basket is in the expanded state and when it is in the collapsed state.

4 Claims, 7 Drawing Sheets

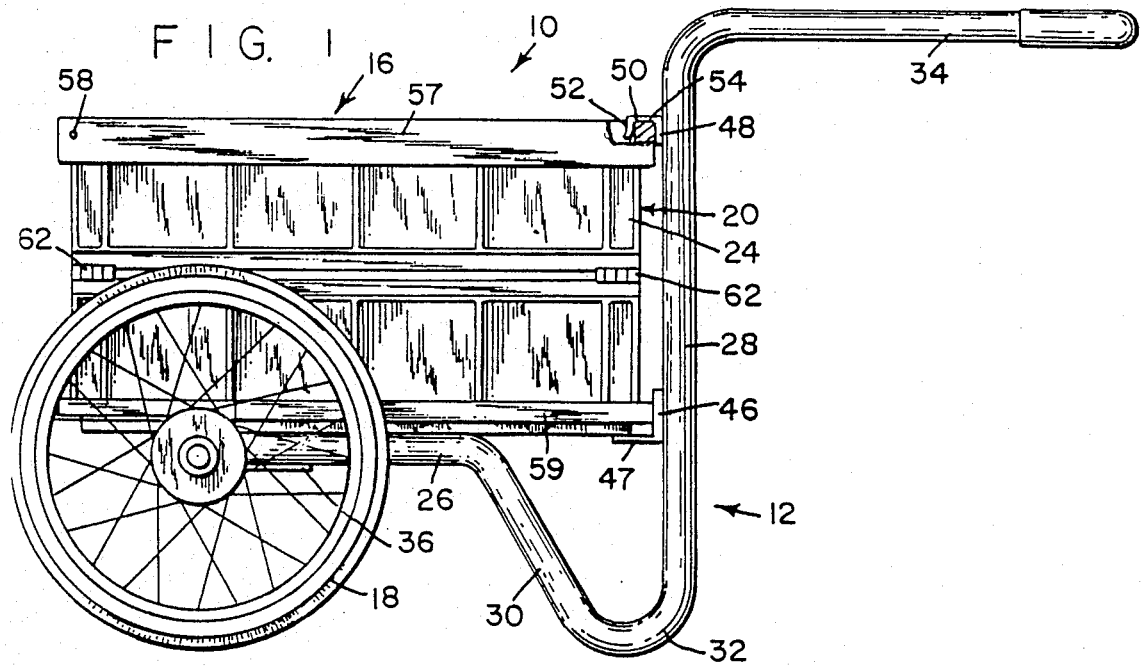
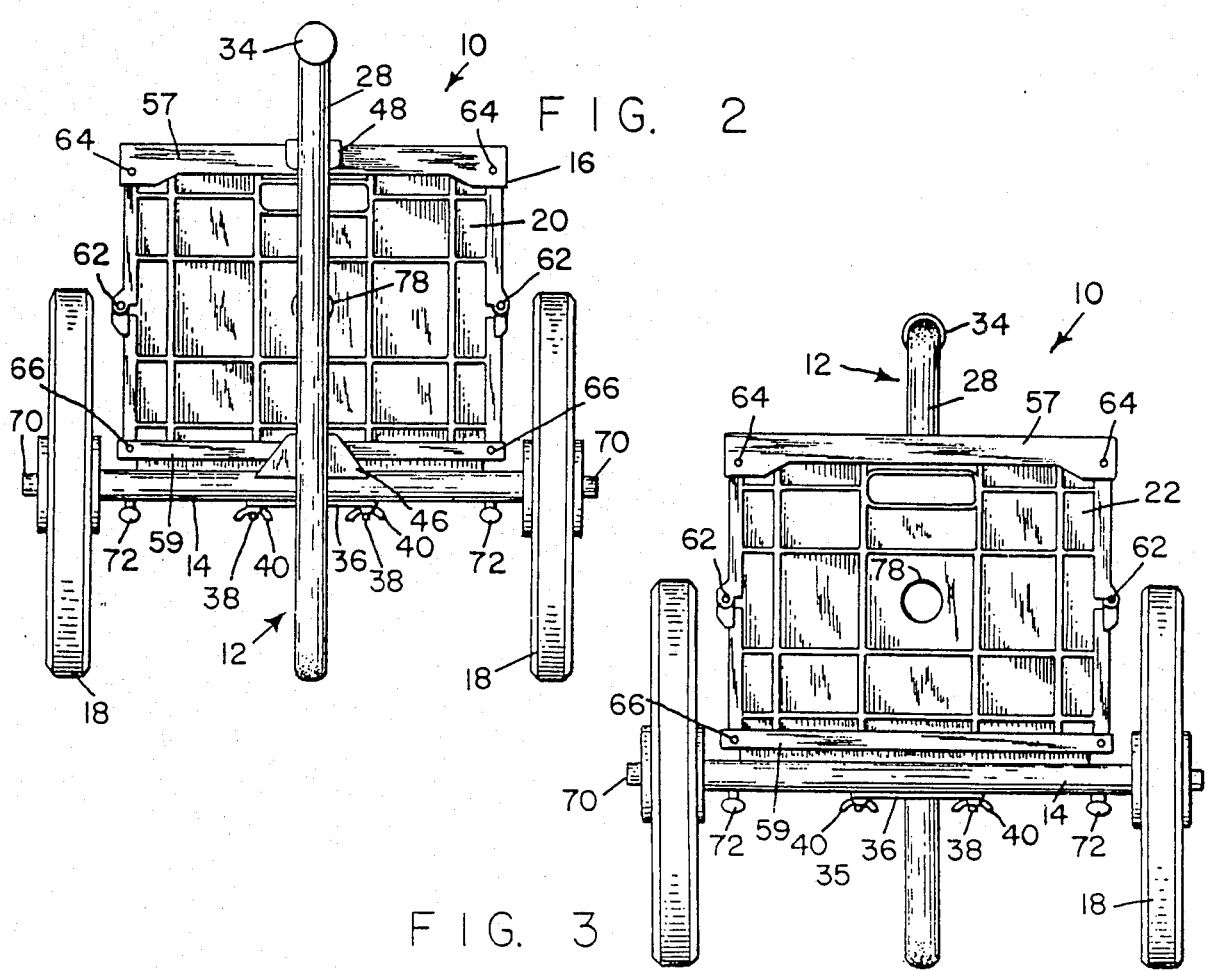

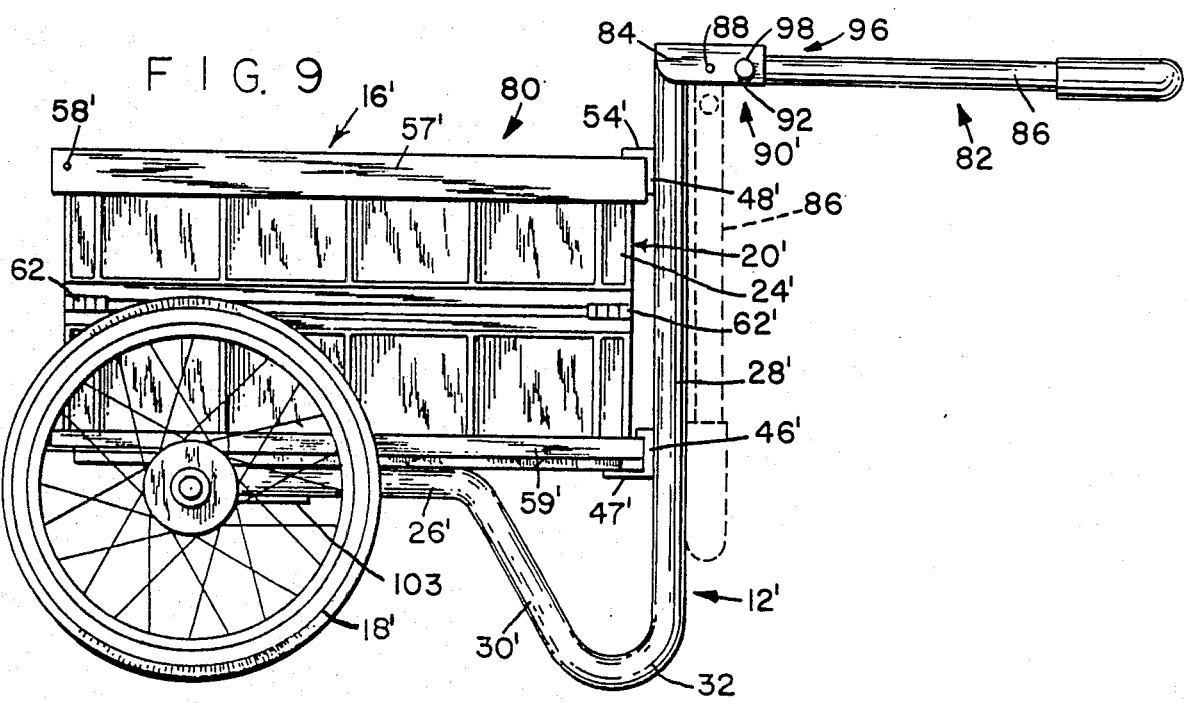
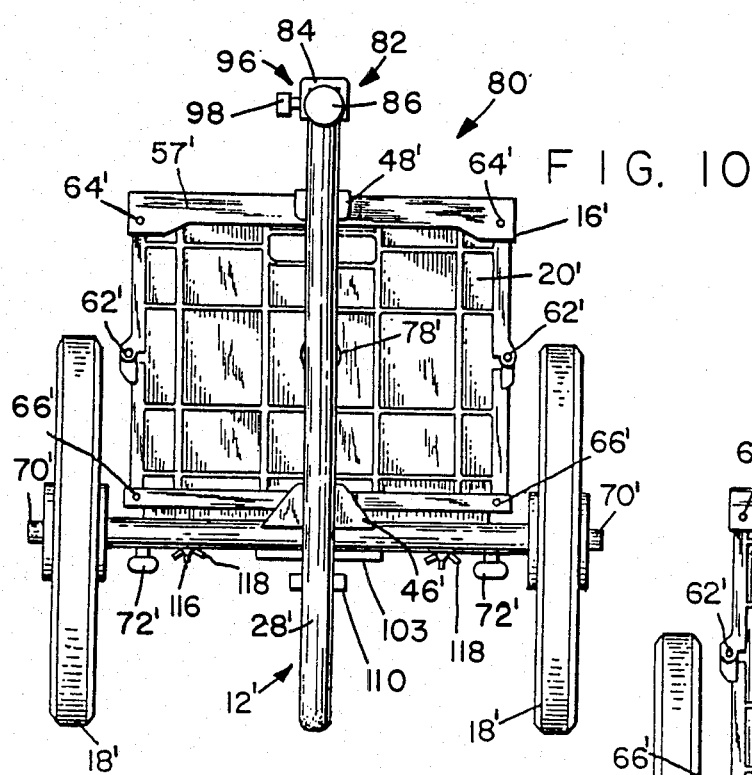
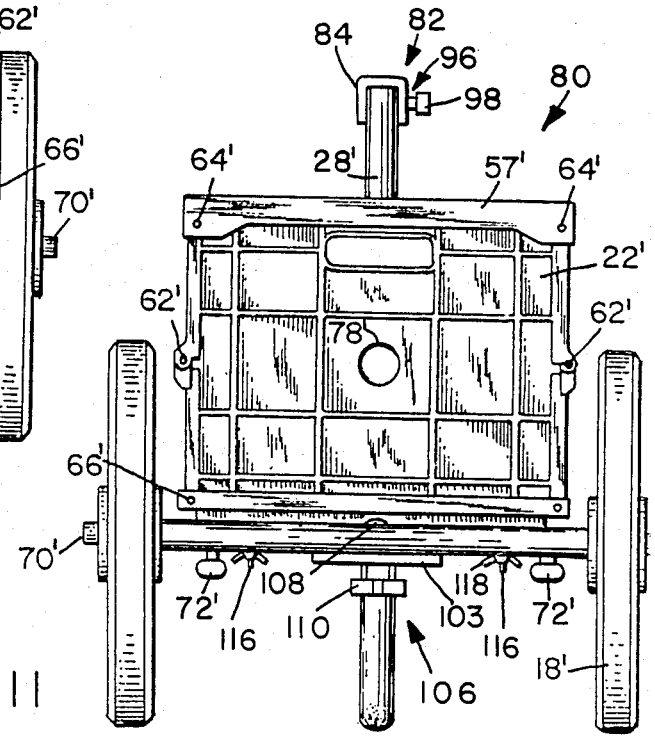

COLLAPSIBLE CART

This is a continuation-in-part of copending application Ser. No. 711,599, filed on Mar. 13, 1985, now U.S. Pat. No. 4,635,956.

BACKGROUND OF THE INVENTION

The present invention relates generally to a multipurpose hand cart and, more particularly, to a collapsible hand cart which can be broken down into a compact package which can be transported and stored very easily.

Carts have been developed for a variety of purposes and for transporting a variety of goods or products. Despite their usefulness, carts present a storage problem when not in use and are difficult to transport because of their bulk. Some carts have been developed with features for obviating the storage and transportation problems. These features include foldable, telescopic or detachable frame elements which are effective in reducing the overall bulk of the cart. However, in all cases, the storage portion of the cart is an integral rigid structure which can not be broken down. Since the storage portion represents a substantial portion of the cart, storage and transportation of the cart remains a significant problem. These and other difficulties experienced with the prior art carts have been obviated by the present invention.

It is, therefore, a principle object of the invention to provide a collapsible cart which utilizes a collapsible storage basket.

Another object of this invention is the provision of a collapsible cart which utilizes a collapsible storage basket and which includes basket supporting means which automatically support the basket in either its expanded state or its collapsed state.

A further object of the present invention is the provision of a collapsible cart which utilizes a collapsible storage basket and which is capable of being disassembled into a compact package.

It is another object of the present invention to provide a collapsible cart which has a simplified framework which consists essentially of two elongated elements which are detachably connected.

A still further object of the invention is the provision of a collapsible cart which utilizes a collapsible storage basket and detachable elements which are connected by a minimum of finger actuated connecting elements.

It is a further object of the invention to provide a collapsible cart which is simple in construction, which is inexpensive to manufacture, and which is capable of a long life of useful service with a minimum of maintenance.

With these and other objects in view, as will be apparent to those skilled in the art, the invention resides in the combination of parts set forth in the specification and covered by the claims appended hereto.

SUMMARY OF THE INVENTION

The invention consists of a collapsible cart having an elongated longitudinal frame member, an elongated horizontal frame member, a pair of wheels which are rotatably mounted on the ends of the cross frame member, a collapsible storage basket having planar rectangular walls which are adapted to be folded into a compact stack and means for supporting the storage basket on the frame members in the expanded state and in the collapsed state.

BRIEF DESCRIPTION OF THE DRAWINGS

The character of the invention, however, may be best understood by reference to one of its structural forms, as illustrated by the accompanying drawings, in which:

FIG. 1 is a side elevational view of a cart embodying the principles of the present invention, FIG. 2 is a front elevational view of the cart, FIG. 3 is a rear elevational view of the cart, FIGS. 9-13 are similar to FIGS. 1-5, respectively, and illustrate a modified cart.

DESCRIPTION OF THE PREFERRED EMBODIMENT

Figure 4:
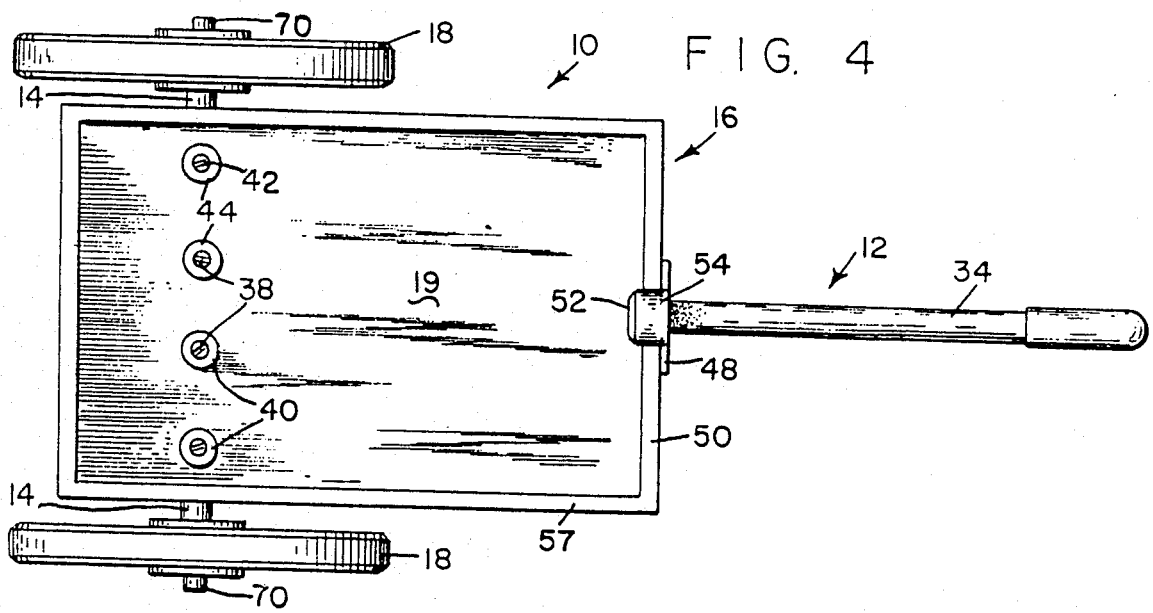
FIG. 4 is a top plan view of the cart.

Referring to FIGS. 1-5, the collapsible cart of the present invention is generally indicated by the reference numeral 10 and is shown as being of the type intended for use as a hand cart. The hand cart 10 comprises an elongated horizontal tubular frame member, generally indicated by the reference numeral 12, and a tubular cross frame member 14 which is detachably connected to the longitudinal frame member 12. A collapsible basket, generally indicated by the reference numeral 16, is supported on the frame members 12 and 14 and a pair of wheels 18 are rotatably mounted on the ends of the cross member 14.

The collapsible basket 16 is a commercially available collapsible storage basket and comprises a bottom wall 19, a front wall 20, a back wall 22, and a pair of side walls 24. The bottom wall 19 is horizontal and the walls 20, 22, and 24 are all vertical when the basket 16 is in the expanded condition or state as illustrated in FIGS. 1-3. The horizontal frame member 12 consists of a horizontal rearward portion 26 which is located beneath the bottom wall 19 and a vertical forward portion 28 which extends in front of the front wall 20. The rearward portion 26 and the forward portion 28 are connected by an intermediate portion 30 which is formed into a curved supporting foot 32 where the intermediate portion 30 joins the forward portion 28. A freely extending horizontal handle portion 34 extends forwardly from the top of the forward portion 28.

Figure 5:
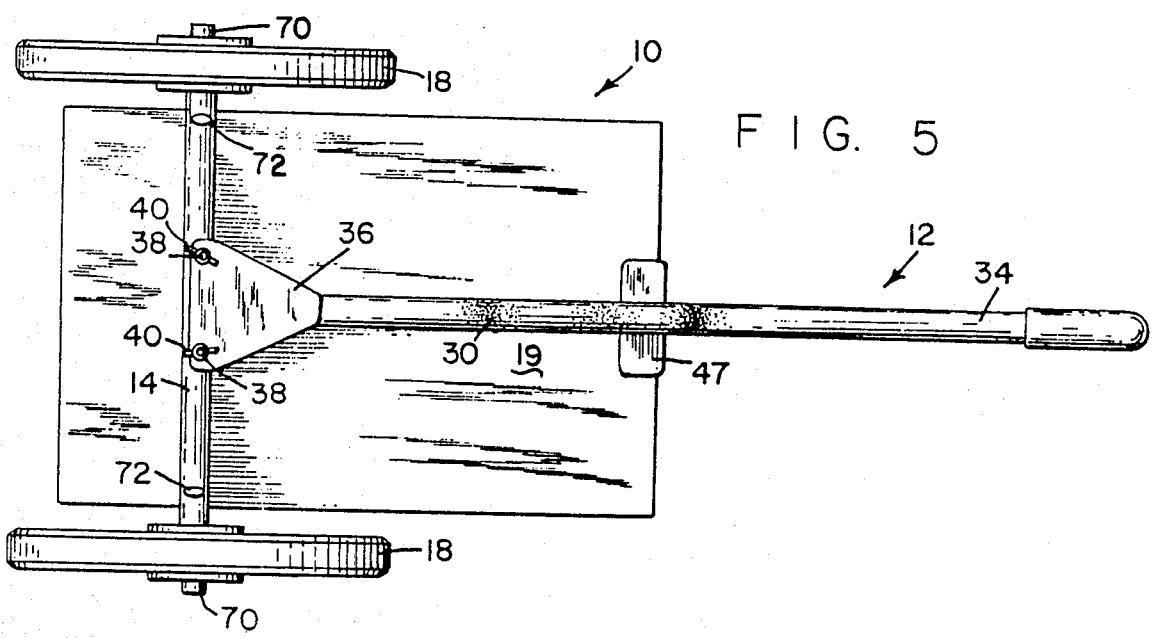
FIG. 5 is a bottom plan view of the cart.

The longitudinal frame member 12 is detachably connected to the cross frame member 14 by means of a flat plate 36 which is fixed (as for example by welding) to the horizontal rearward portion 26 and which extends freely beneath the cross frame member 14 as shown in FIG. 5. A pair of bolts 38 extends through the bottom wall 19, the cross member 14 and the plate 36 for receiving a pair of wing nuts 40. The bolts 38 and wing nuts 40 detachably connect the plate 36 to the cross member 14 and also connect the rearward portion of the collapsible basket 16 to the cross frame member 14. Additional bolts 42 also connect the collapsible basket 16 to the cross member 14 as shown in FIG. 4. Washers 44 are preferably employed between the heads of the bolts 38 and 42 and the bottom wall 18 to provide a larger bearing surface against the upper surface of the wall 19, particularly when the basket is made of a soft material, such as plastic. The forward end of the basket 16 is supported on a rearwardly extending flange 47 of a first bracket 46 which is fixed to the vertical forward portion 28 of the longitudinal frame member 12. A second bracket 48 is also fixed to the vertical forward portion 28 about the first bracket 46 and includes a rearwardly extending horizontal flange 54 which extends above the front wall 20 and terminates in a downwardly extending lip 52.

The basket 16 also comprises a rectangular top frame 57 which includes a top edge 50. The bottom wall 19 is provided with a rectangular upwardly extending flange 59. The back wall 22 is pivotally connected to the rear end of the top longitudinal legs of the top frame 57 by means of pivot pins 58. The front wall 20 is pivotally connected to the longitudinal legs of the top frame 57 in the same manner as the back wall 22 by means of pivot pins, not shown. Each of the side walls 24 is divided into upper and lower portions which are pivotally connected by hinges 62. The upper portion of each side wall 24 is pivotally connected to the cross legs of the top frame 57 by pivot pins 64. The lower portion of each side wall 64 is pivotally connected to the cross legs of the rectangular flange 59 by means of pivot pins 66. When the collapsible basket 16 is in the expanded state as shown in FIGS. 1–5, the flange 50 of the second bracket 48 abuts the top edge of the forward leg of the top frame 57 and the lip 52 extends downwardly inside the top frame 57 as shown in FIG. 1. The second bracket 48, thereby stabilizes the basket 16 and holds it firmly against the forward portion 28 of the frame. Each wheel 18 is rotatably mounted on a shaft 70 which is adapted to be inserted into the open end of the cross frame member 14 and locked in place by a thumb screw 72. The thumb screw 72 is threaded into the cross frame member 14 and engages the shaft 70 which is positioned within the cross member.

Figure 6:
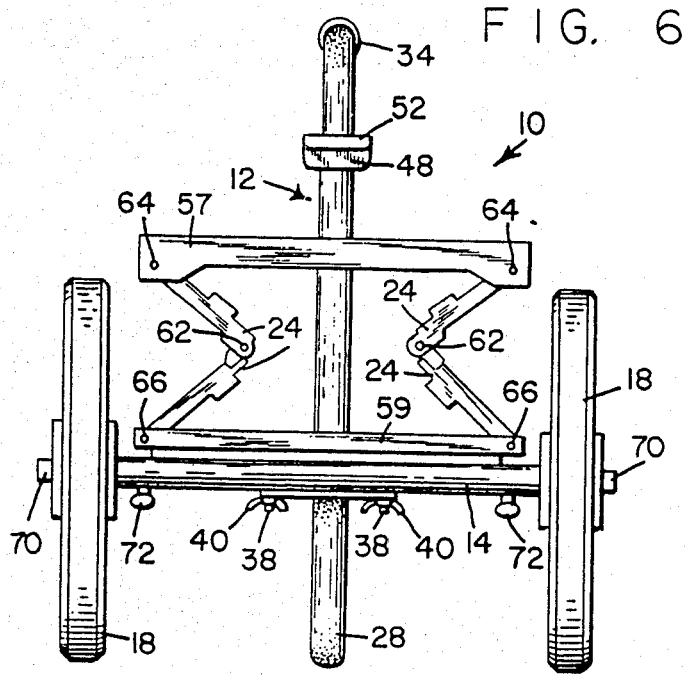
FIG. 6 is a rear elevational view of the cart showing the storage container in a partially collapsed state.
Figure 8:
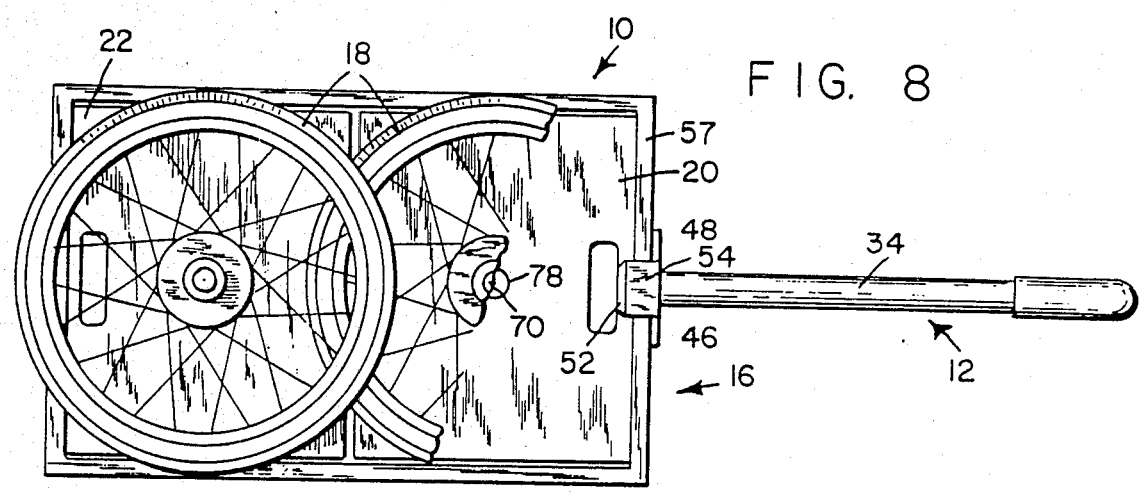
FIG. 8 is a top plan view of the cart showing the storage container in the collapsed state and the cart partially disassembled.
Figure 7:
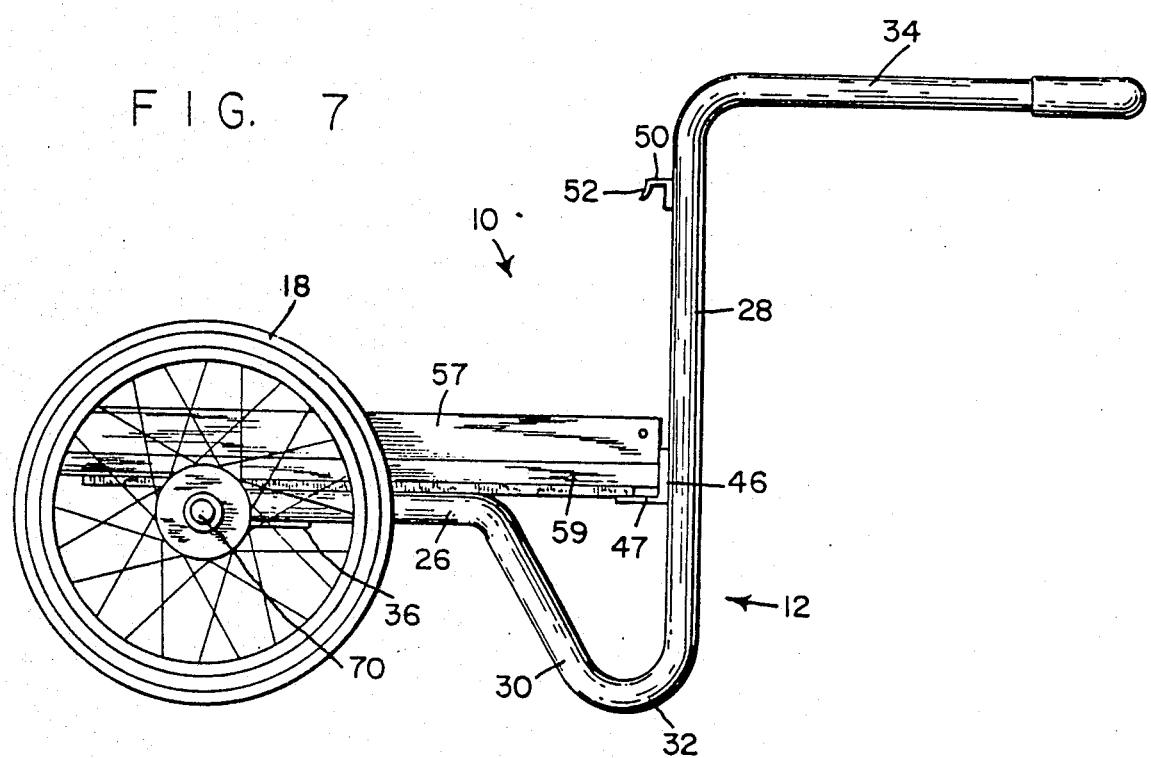
FIG. 7 is a side elevational view of the cart showing the storage container in the fully collapsed state.
Figure 12:
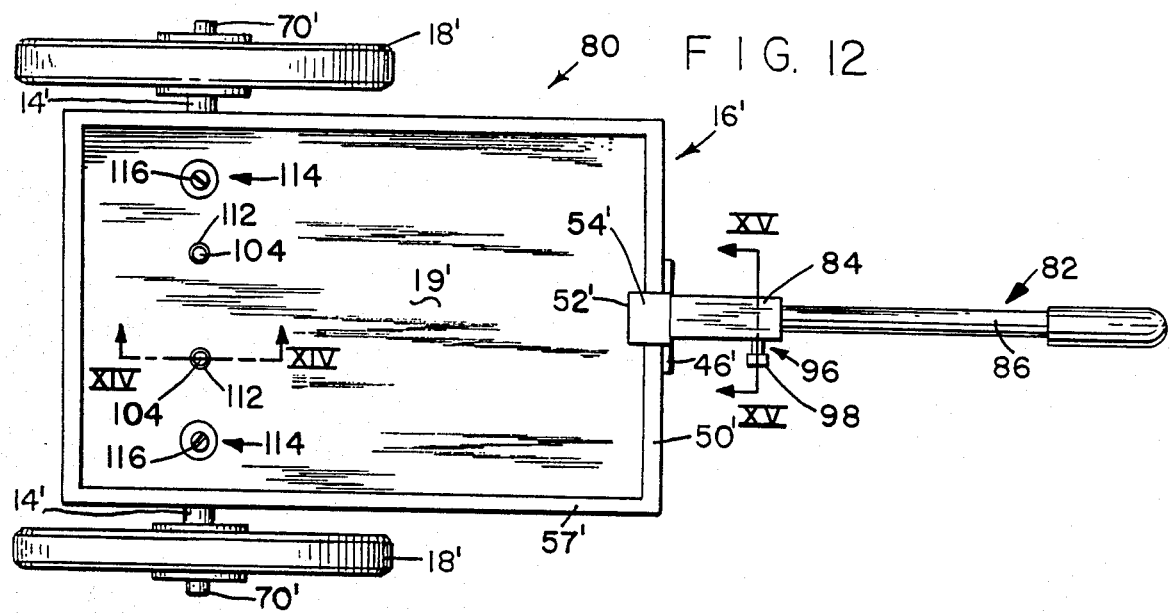
Figure 13:
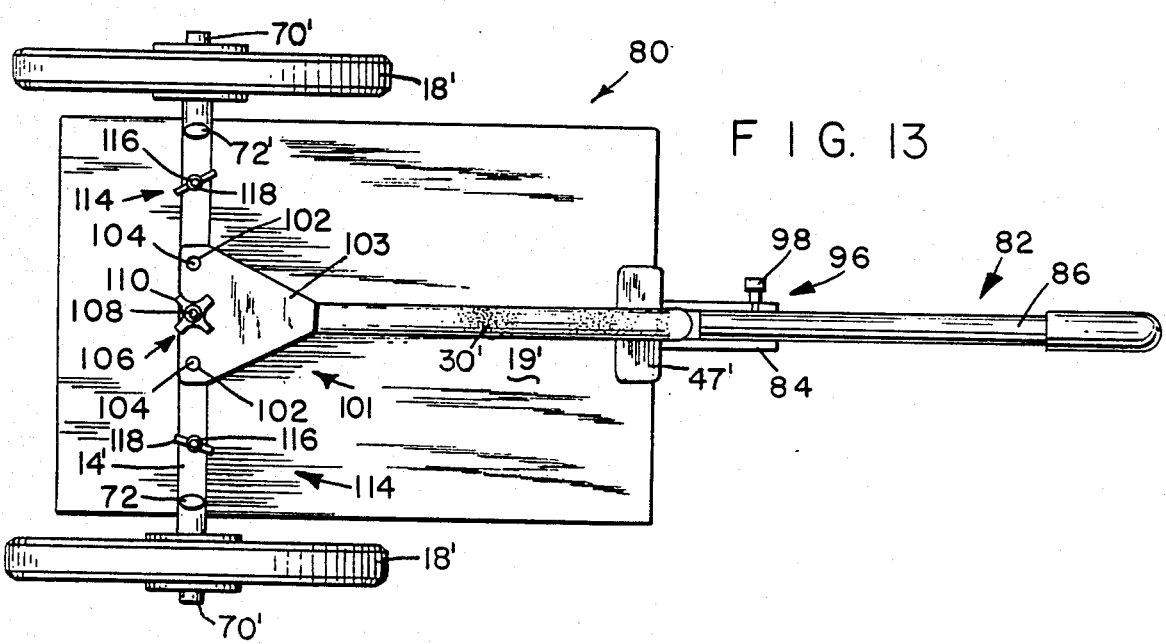
Figure 14:
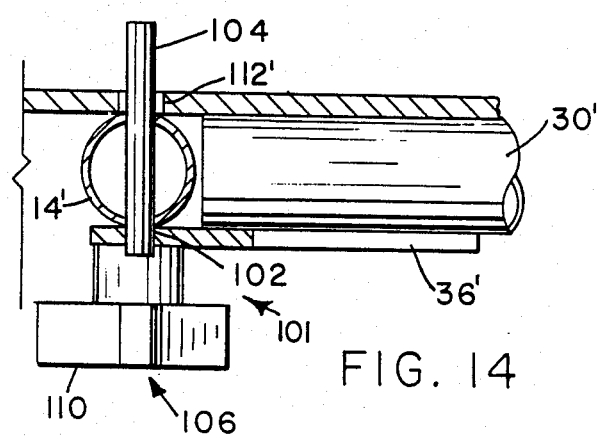
FIG. 14 is a vertical cross-sectional view taken along the line XIV—XIV of FIG. 12 and looking in the direction of the arrows.

The operation and advantages of the present invention will now be readily understood in view of the above description. FIGS. 1–5 show the cart 10 in the fully assembled with the collapsible basket 16 in the fully expanded state. The cart 10 is collapsed by first collapsing the basket 16. The first step in collapsing the basket 16 is to swing the front wall 20 and the rear wall 22 towards the middle of the basket so that both walls lie within the top frame 57. The side walls 24 are then folded about the hinges 62 as shown in FIG. 6 until the top frame 57 rests directly on the top edge of the flange 59 as shown in FIG. 7. The thumb screws 72 are then loosened so that the shafts 70 can be removed from the cross frame member 14. The wheels 18 are removed from the ends of the cross frame member and positioned on top of the collapsed basket 16 so that the shafts 70 extend into appropriate apertures 78 in the front and back walls 20 and 22, respectively as shown in FIG. 8. The last step of disassembling the cart 10 is accomplished by removing the wing nuts 40 from the bolts 38 and lowering the plate 36 away from the bolts 38 to remove the longitudinal frame member 12 from the cross frame member 14. The horizontal frame member 14 is then positioned on top of the wheels 18 to form a complete compact package for storage and transporting. The cart 10 is reassembled by following the steps of disassembly in the reverse order. After the longitudinal frame member 12 is attached to the horizontal frame member 14, the wheels 18 are applied to the ends of the cross frame member 14. The basket 16 is expanded. When expanding the basket 16, the top frame 57 is raised absolutely vertically so that the top edge of a forward leg of the frame 57 passes in front of the lip 52 before abutting the rearwardly extending portion 50 of the second bracket 48. The front and back walls 20 and 22, respectively, are then lowered about the pivot pins 60 and 58, respectively, so that they extend vertically as shown in FIGS. 2 and 3.

MODIFIED CART

Referring to FIGS. 9–15, there is shown a modified cart which is generally indicated by the reference numeral 80. The modified cart 80 is identical to the cart 10 shown in FIGS. 1–11 in most respects. The elements of the modified cart 80 which are identical to the elements of the cart 10 are identified with the same reference numerals with the addition of a prime. The modified cart 80 differs from the cart 10 primarily in the construction of the handle and the means for mounting the collapsible basket on the frame.

Referring particularly to FIGS. 9–11, the cart 80 comprises a collapsible handle mechanism, generally indicated by the reference numeral 82. The handle mechanism 82 comprises a bracket 84 which is fixed to the upper end of the vertical forward portion 28' of the frame 12' and a handle 86 which is pivotally connected to the bracket 84 by means of a pivot pin 88.

Figure 15:
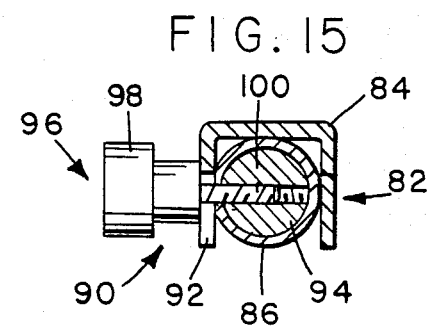
FIG. 15 is a vertical cross-sectional view taken along the line XV—XV of FIG. 12 and looking in the direction of the arrows.
Figure 16:
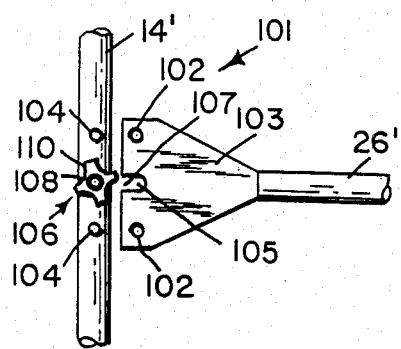
FIG. 16 is a fragmentary bottom plan view of the cart and showing a connecting element for the frame of the FIG. 17 is a fragmentary side elevational view of the cart, showing a modified connecting means for the handle.

Referring also to FIG. 15, the bracket 84 has an inverted U-shaped cross-section The shank portion of the handle 86 lies within the legs of the bracket 84 as shown in FIGS. 10 and 15. The handle 86 is movable from a horizontal operative position shown in full lines in FIG. 9 to a collapsed vertical position shown in dotted lines. The handle 86 is locked in the operative full line position by means of releasable locking means which is generally indicated by the reference numeral 90. Releasable locking means 90 comprises a vertical slot 92 in one of the legs of the bracket 84, an internally threaded tube 94 and a locking screw 96. The tube 94 extends horizontally between the legs of the bracket 84 in alignment with the slot 92. The tube 94 is fixed to the handle 86 and the end of the tube which is adjacent the slot 92 is open for receiving a threaded shank portion 100 of the screw 96. The screw 96 has an enlarged head portion 98 which enables the screw to be finger tightened against the bracket 84 for maintaining the handle 86 in the operative or horizontal position shown in full lines in FIG. 9. The pivoted handle 82 has several advantages. First, the cart can be stored more easily in the assembled state within a shed or garage by folding the handle to the inoperative or vertical positions shown in dotted lines in FIG. 9. Also, since the extending handle is not a limiting factor in storage, the handle can be made longer. Finally, since the handle can be folded alongside of the vertical extending portion 28 of the frame, the frame constitutes a more compact element for storage when the cart is completely disassembled.

Referring to FIGS. 12-14 and 16, the intermediate portion 30' of the frame is connected to the cross frame member 14' by connecting means, generally indicated by the reference numeral 101. The connecting means 101 comprises a triangular shaped connecting bracket 103 which is identical in shape to bracket 36 and comprises a pair of spaced apertures 102. The bracket 103 has a slot 105 (see FIG. 16) with a rearwardly facing opening 107. The slot 105 is located between the apertures 102. The connecting means 101 also comprises a pair of spaced stabilizing pins 104 which are fixed to the cross frame member 14' and which extend through the apertures 102, see also FIG. 14. The pins 104 stabilize the horizontal rear portion 26' against movement relative to the cross frame member 14' in any horizontal direction. Relative vertical movement between the cross frame member 14' and the horizontal rear portion 26' is prevented by first removable fastening means, generally indicated by the reference numeral 106. The fastening means 106 comprises a bolt 108, see FIGS. 11 and 13, having a threaded end which extends freely through the cross frame member 14' and the slot 105 of the connecting bracket 103 so that it extends below the bracket and the pins 104 for receiving a nut 110. The head of the nut 110 is enlarged to enable the nut to be finger-tightened for vertically clamping the bracket 103 cross frame member 14' and the bottom wall 19'. The horizontal frame portion 26' is disconnected from the cross frame member by loosening the nut 110 and advancing it away from the crosspiece a sufficient distance to enable the bracket to be moved downwardly so that it clears the pins 104. The bracket 103 can then be moved horizontally forwardly away from the bolt 108 without fully removing the nut 110. This insures that the nut will not be accidentally lost or misplaced. It is also preferred that the end of the bolt 108 be swaged to prevent removal of the nut 110 from the bolt. The stabilizing pins 104 also extend upwardly through a pair of spaced holes 112 in the bottom wall 19' of the basket. This locates the basket in a correct position relative to the frame so that it is supported between the brackets 46' and 48' against vertical movement relative to the frame. The stabilizing pins prevent horizontal movement of the basket relative to the frame and enables the basket to be removed from the frame by, first, lifting the rear end of the basket so that the bottom wall 19' is above the top of the pins 104 and, then, sliding the basket away from the brackets 46' and 48'. Although the front end of the basket is restrained between the brackets 46 and 48, there is sufficient give in the basket and there is enough clearance in the holes 112 to enable the rear portion of the basket to be lifted clear of the stabilizing pins 104 and then lifted upwardly and rearwardly of the brackets 46' and 48'. This adds a new useful dimension to the cart. The basket can be filled with material and the cart can be wheeled from one location to another, whereupon the basket can be lifted from the frame for further use, such as dumping the contents or carrying the basket and contents up a ladder or a flight of stairs. When there is no need for this function, the basket is secured to the frame by second removable fastening means, generally indicated by the reference numeral 114. The fastening means 114 comprises a pair of screws 116 which extend through additional holes in the bottom wall 19' of the basket and through the cross member 14' so that the threaded ends of the screws extend below the cross frame member for receiving wing nuts 118.

Figure 17:
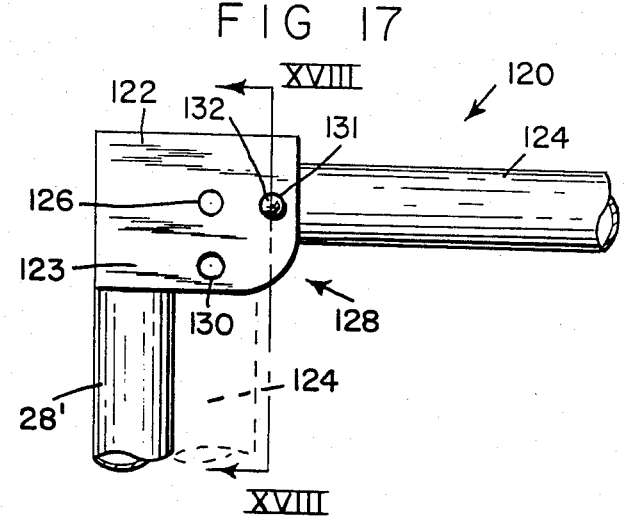
Figure 18:
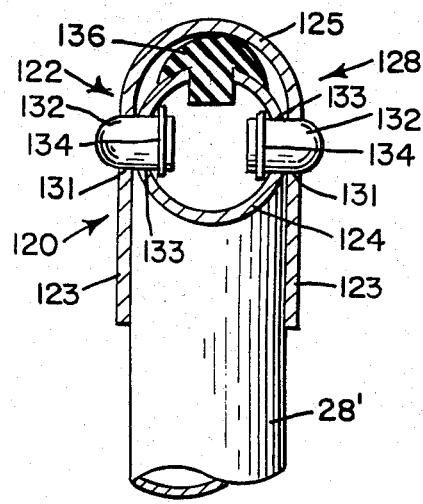
FIG. 18 is a vertical cross-sectional view taken along line XVIII—XVIII and looking in the direction of the arrows.

Referring to FIGS. 17 and 18, there is shown a further modification of the handle construction which is generally indicated by the reference numeral 120. The modified handle construction 120 includes a connecting bracket 122 which is fixed to the upper end of the vertical forward portion 28' of the frame and a handle 124 which is similar to the handle 86 and is pivotally connected to the bracket 122 by a pivot pin 126. The handle 124 can be pivoted between a horizontal position shown in full lines in FIG. 17 to the vertical position shown in dotted lines in FIG. 17.

The handle is locked in either the horizontal position or the vertical position by detent locking means generally indicated by the reference numeral 128. The bracket 122 is generally U-shaped in cross-section and includes a pair of side walls 123 which are connected by a top wall 125. The locking means 128 comprises a lower aperture 130 and an upper aperture 131 in each side wall 123 and a pair of plungers 132 which are slidably mounted in apertures 133 in the handle 124 for lateral horizontal movement relative to the handle 124. The plungers 132 are biased away from each other by a pair of leaf springs 134, one for each plunger 132. One end of each spring 134 is connected to the inner end of its respective plunger 132 and acts as a stop to prevent the plunger from passing completely through the aperture 133. The opposite end of each spring 134 is fixed the inner surface of the handle 124 for biasing the plunger towards its outer most position as shown in FIG. 18. When the handle 124 is in the horizontal position shown in full lines in FIG. 17, the plungers 132 are aligned with the apertures 131 and extend through the aperture 131 as shown in FIG. 18 for locking the handle 124 is in the vertical position as shown in dotted lines in FIG. 17. The plungers 132 are aligned with the apertures 130 and extend through the apertures 130 for locking the handle in the vertical position. The handle is released from either position by pushing the plungers 132 toward each other with the fingers of one hand while pivoting the handle with the other hand. The rounded ends of the plungers 132 enable the plungers to snap out of either pair of apertures 131 or 130 while a pivoting force is being applied to the handle 124.

An elastomeric snubber 136 is mounted to the top of the handle 124 at a point where it will strike the upper wall 125 when the handle is brought to the horizontal position. This prevents wear and distortion to the upper wall 125 by the handle 124 due to frequent repositioning of the handle as a result of normal use of the cart for this intended function.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A cart comprising:
    (a) an elongated longitudinal frame member having a horizontal rear portion, a vertical forward portion, which has a top end and a handle which is connected to said top end, (b) an elongated horizontal cross frame member which extends at a right angle to said longitudinal frame member, (c) a pair of wheels which are rotatably mounted on opposite ends of the cross frame member, (d) a connecting bracket which is fixed to the rear end of said horizontal rear portion and which is vertically aligned with said cross frame member, said bracket having a pair of spaced apertures, which are vertically aligned with said cross frame member, (e) a pair of spaced vertical stabilizing pins which are fixed to said horizontal cross frame member and which extend, respectively, through said pair of spaced apertures for stabilizing said horizontal frame member against movement relative to said horizontal rear portion in any horizontal direction, (f) first removable fastening means for operatively connecting said connecting bracket to said horizontal rear portion to prevent relative vertical movement between said cross frame member and said horizontal rear portion, first removable fastening means comprising:
 (1) a bolt which is anchored to said horizontal cross frame member and which is located between said pair of stabilizing pins, said bolt having a threaded end which extends vertically from said horizontal cross frame member in the same direction as said pins and beyond said pins,
 (2) a nut which is threaded onto the threaded end of said bolt, and
 (3) a slot in said connecting bracket which is located between said pair of spaced apertures and which has a rearwardly facing opening which is vertically aligned with said bolt when said stabilizing pins extend through said apertures to permit removal of said connecting bracket from said bolt while said nut is attached to said bolt, (g) an integral collapsible storage basket having planar rectangular walls and being located to the rear of said vertical forward portion, said storage basket being adjustable between an expanded state in which the walls define a storage compartment which is rectangular in cross-section and a collapsed state in which the walls are folded into a compact stack, said storage basket, in said expanded state, having a horizontal bottom wall, a vertical back wall, a vertical front wall which has a top edge, and a pair of vertical side walls, each of said vertical walls assuming a horizontal orientation on top of said bottom wall when said storage basket is in said collapsed state, and (h) supporting means for supporting the storage basket on the frame members in said expanded state and said collapsed state said supporting means comprising second removable fastening means for removably fastening the bottom wall of said storage basket to one of said frame members, and supporting bracket means which is fixed to said longitudinal frame member for supporting the front end of said storage basket.

2. A cart as recited in claim 1, wherein the bottom wall of said storage basket has a pair of spaced holes which are vertically aligned with said stabilizing pins and said pins extend upwardly through said holes for preventing horizontal movement of said storage basket relative to said frame members, so that the storage basket is supported sufficiently on said frame members for horizontal movement of said cart and so that said storage basket can be removed from said frame members in the absence of said second removable fastening means by lifting the basket away from the frame members.

3. A cart as recited in claim 1, wherein said handle is pivotally connected to the top end of said vertical forward portion for movement between a vertical position in which the handle is parallel with said vertical for position and a horizontal position in which the handle extends at a right angle to said vertical forward portion.

4. A cart as recited in claim 1, wherein said cart comprises means for releasably locking said handle in said horizontal position.

* * * * *